United States Patent [19]

Mizuno et al.

[11] Patent Number: 4,839,550
[45] Date of Patent: Jun. 13, 1989

[54] CONTROLLED TYPE MAGNETIC BEARING DEVICE

[75] Inventors: Takeshi Mizuno; Toshiro Higuchi, both of Tokyo, Japan

[73] Assignee: Seiko Seiki Kabushiki Kaisha, Chiba, Japan

[21] Appl. No.: 808,237

[22] Filed: Dec. 13, 1985

Related U.S. Application Data

[63] Continuation of Ser. No. 550,960, Nov. 10, 1983.

[51] Int. Cl.$^4$ .............................................. F16C 39/06
[52] U.S. Cl. ..................................... 310/90.5; 324/207
[58] Field of Search ............................ 308/10; 74/5.46; 324/207

[56] References Cited

U.S. PATENT DOCUMENTS

| | | | |
|---|---|---|---|
| 3,473,852 | 10/1969 | Lyman | 308/10 |
| 3,508,444 | 4/1970 | Sitomer | 308/10 |
| 4,037,886 | 7/1977 | Boden | 308/10 |
| 4,300,807 | 11/1981 | Poubeau | 308/10 |
| 4,417,772 | 11/1983 | Robinson | 308/10 |

FOREIGN PATENT DOCUMENTS 2109596   6/1983   United Kingdom .................. 308/10

OTHER PUBLICATIONS

A. H. Church; Mechanical Vibrations; 2nd Ed.; John Wiley & Sons, Inc.; New York & London; 1963.
J. O'Reilly; Observer for Linear Systems; Academic Press; London, New York; 1983.

Primary Examiner—R. Skudy
Attorney, Agent, or Firm—Bruce L. Adams; Van C. Wilks

[57] ABSTRACT

A controlled type magnetic bearing device which has at least two radius direction magnetic bearings, characterized in that the radius direction magnetic bearing control device has either or both of a static unbalance compensator for suppressing a whirling caused by static unbalance and a dynamic unbalance compensator for suppressing a whirling caused by dynamic unbalance.

3 Claims, 6 Drawing Sheets

CONTROLLED TYPE MAGNETIC BEARING DEVICE

This is a continuation of application Ser. No. 550,960, filed Nov. 10, 1983.

BACKGROUND OF THE INVENTION

The present invention relates to a controlled type magnetic bearing device which suppresses the whirling or swing rotation due to the unbalance of a rotating body.

A magnetic bearing is a device which supports a rotating body by utilizing magnetic power. This type of bearing has been studied recently because of its excellent advantages that it is free of wear and fatigue. Magnetic bearings are used, for example, for a turbomolecular pump, a centrifugal separator, a spindle for rotary machines, etc.

Since the rotating body is used as an element of the magnetic bearing in a magnetic bearing device, when the rotating body is not balanced, it provokes strong whirling, i.e., undergoes swing rotation about its axis of rotation, and causes the following troubles:

(1) Increase of oscillation and noise.
(2) Increase of electric power loss on account of the increase of current to be supplied to the electromagnetic coil caused by the increase of whirling.

As a result, the electric power circuit in the controlled type magnetic bearing device must be of relatively large scale.

(3) Decrease in machining performance because of an inaccuracy of rotation due to an unbalance caused by the mounted tool in the case where the magnetic bearing is used for a machining spindle.
(4) Time required for correcting the unbalanced state.

The object of the present invention is to provide a controlled type magnetic bearing device which suppresses the whirling motion or swing rotation due to the unbalance of a rotating body supported by a controlled type magnetic bearing. The present invention is characterized by the arrangement of a static unbalance compensator and/or a dynamic unbalance compensator in a radial direction magnetic bearing device so as to lessen the whirling force caused by the unbalance state.

DETAILED DESCRIPTION OF INVENTION

The present invention will be described in more detail in conjunction with the accompanying drawings.

Figure 1:
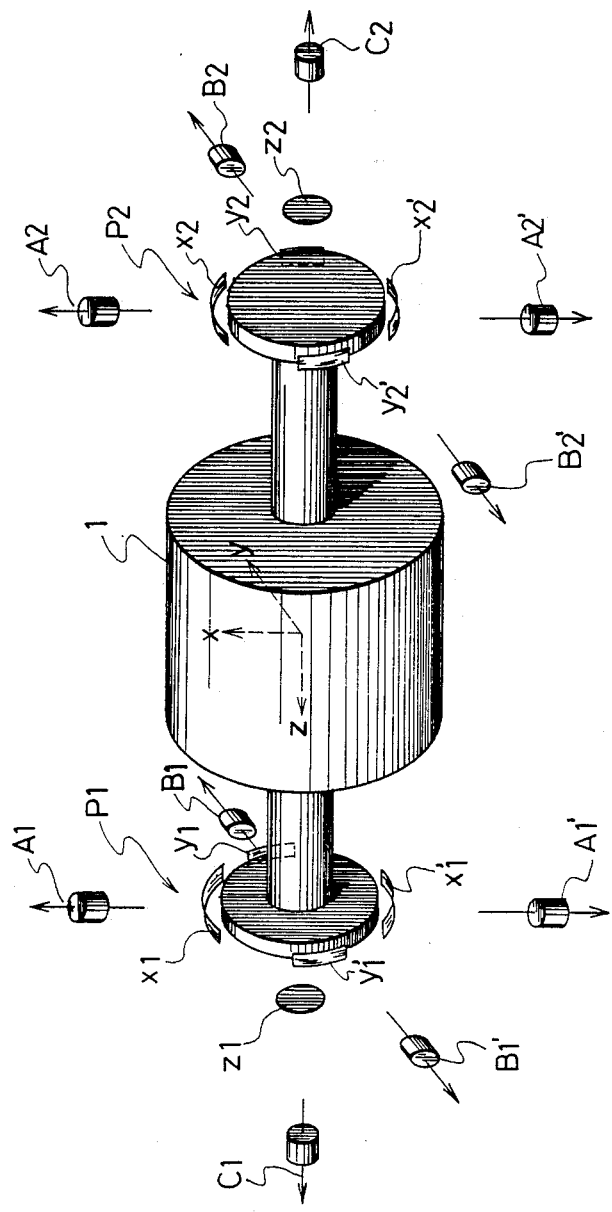
FIG. 1 is a perspective explanatory view showing the general construction of a controlled type magnetic bearing device.

FIG. 1 is a perspective explanatory view showing in schematic form the general construction of a controlled type magnetic bearing device. At the opposite axial ends $P_1$ and $P_2$ of a rotatable body 1 are provided axial direction magnetic bearings which comprise electromagnetic sensing coils $z_1$ and $z_2$ coils for detecting or sensing the axial position of the rotating body 1 in the axial direction. For clarity, the controlling device is omitted, and in operation electric signals representative of the axial positions detected by the coils $z_1$, $z_2$ drive a power amplifier through a compensation circuit, and electromagnetic winding coils $C_1$ and $C_2$ of respective axial direction magnetic bearings are excited and thus the rotating body 1 is magnetically supported to position a predetermined body at the axial position. At each of the axial end positions $P_1$, $P_2$ of the rotating body 1 are arranged two pairs of radial direction magnetic bearings. Each radial direction magnetic bearing comprises a pair of radial electromagnetic sensing coils $x_1$, $x_1'$; $y_1$, $y_1'$ at the $P_1$ end and $x_2$, $x_2'$; $y_2$, $y_2'$ at the $P_2$ end, controlling devices (not shown), and a pair of radial electromagnetic winding coils $A_1$, $A_1'$; $B_1$, $B_1'$ at the $P_1$ end and $A_2$, $A_2'$; $B_2$, $B_2'$ at the $P_2$ end. As well known in the art, the rotary body 1 has six degrees of freedom of motions, three degrees of freedom of translational motions along the x, y and z axes and three degrees of freedom of rotational motions about the x, y and z axes. The present invention is principally concerned with controlling the two degrees of freedom of rotational motions about the x and y axes (the z axis being the axis of rotation about which the body 1 is forcibly rotationally driven).

Figure 2:
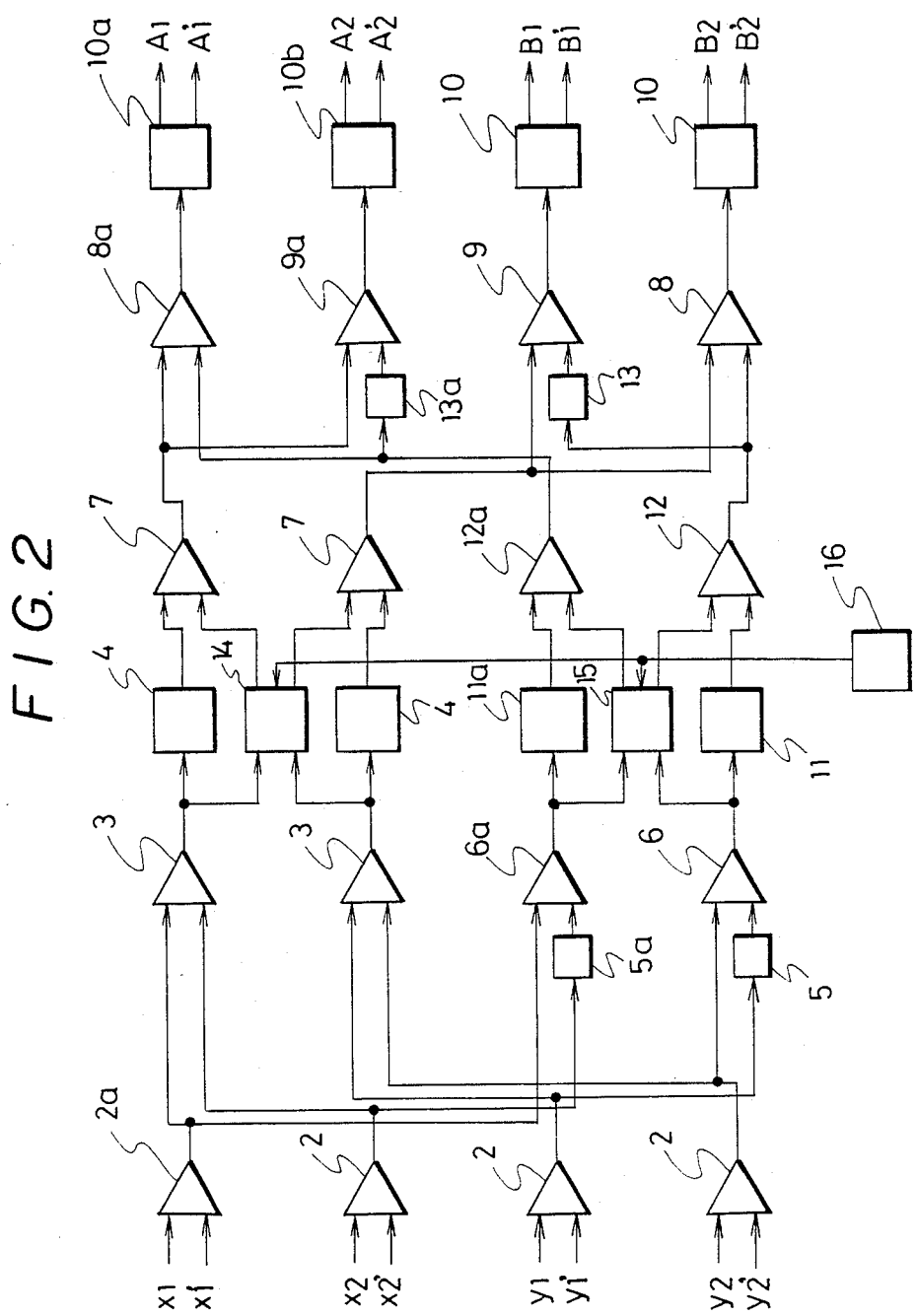
FIG. 2 is a circuit diagram of the controlled type magnetic bearing device.

In FIG. 2, numeral 2 designates adders for pairs of electromagnetic sensing coils $x_1$, $x_1'$ and $x_2$, $x_2'$ for sensing or detecting radial direction position and for pairs of electromagnetic sensing coils $y_1$, $y_1'$ and $y_2$, $y_2'$ or sensing or detecting the radial direction position, 3 designates adders for adding the output signals from the adders 2 and producing signals which represent translational motion of the body 1 in the X-axis direction. The output signals from the adders 3 are led to a compensator circuit 14 (shown in detail in FIG. 3) for compensating the lead in phase and a proportional differential compensating circuit 4, respectively, and the outputs thereof drive power amplifiers 10 through adders 7, 8, 9. As a result, electromagnetic winding coils $A_1$, $A_1'$ and $A_2$, $A_2'$ of respective radial direction magnetic bearings are excited. When the output signal from an inverter 5a is added to the output signal from the adder 2a for the coils $x_1$ and $x_1'$ by an adder 6a, the result becomes a signal component respresentative of rotational movement around the Y-axis. The signal component is fed to a compensator circuit 15 (shown in detail in FIG. 3) for compensating the lead in phase and to a proportional differential compensating circuit 11a, and the outputs thereof drive a power amplifier 10a through adders 8a and 12a to excite electromagnetic winding coils $A_1$ or $A_1'$. The output signal from the adder 12a drives the power amplifier 10b through an inverter 13a and the adder 9a to excite the electromagnetic winding coils $A_2$ or $A_2'$. The outputs from the adders 8 and 9 comprises control signals for controlling the energization of the electromagnetic winding coils.

Thus, for the rotating body 1, the translational motion in the X-axis direction and the rotational movement around the Y-axis are restricted. It can be easily understood that the translational motion in the Y-axis direction and the rotational movement around the X-axis are also restricted in a similar manner as described above using the electromagnetic coils $B_1$, $B_1'$ and $B_2$, $B_2'$ of respective radial direction magnetic bearings.

The main feature of the present invention is to suppress the static unbalance vibration due to the eccentric magnitude of the rotating body 1 and/or the dynamic unbalance vibration due to angular inconsistency between the inertial main axis and the rotational axis. According to a main feature of the invention, the static unbalance compensator 14 and/or the dynamic unbalance compensator 15, and rotational speed detector 16 which is connected to the compensators 14 and 15, are provided in the radical direction magnetic bearing control device which stabilizes the magnetic supporting operation described above.

Figure 3:
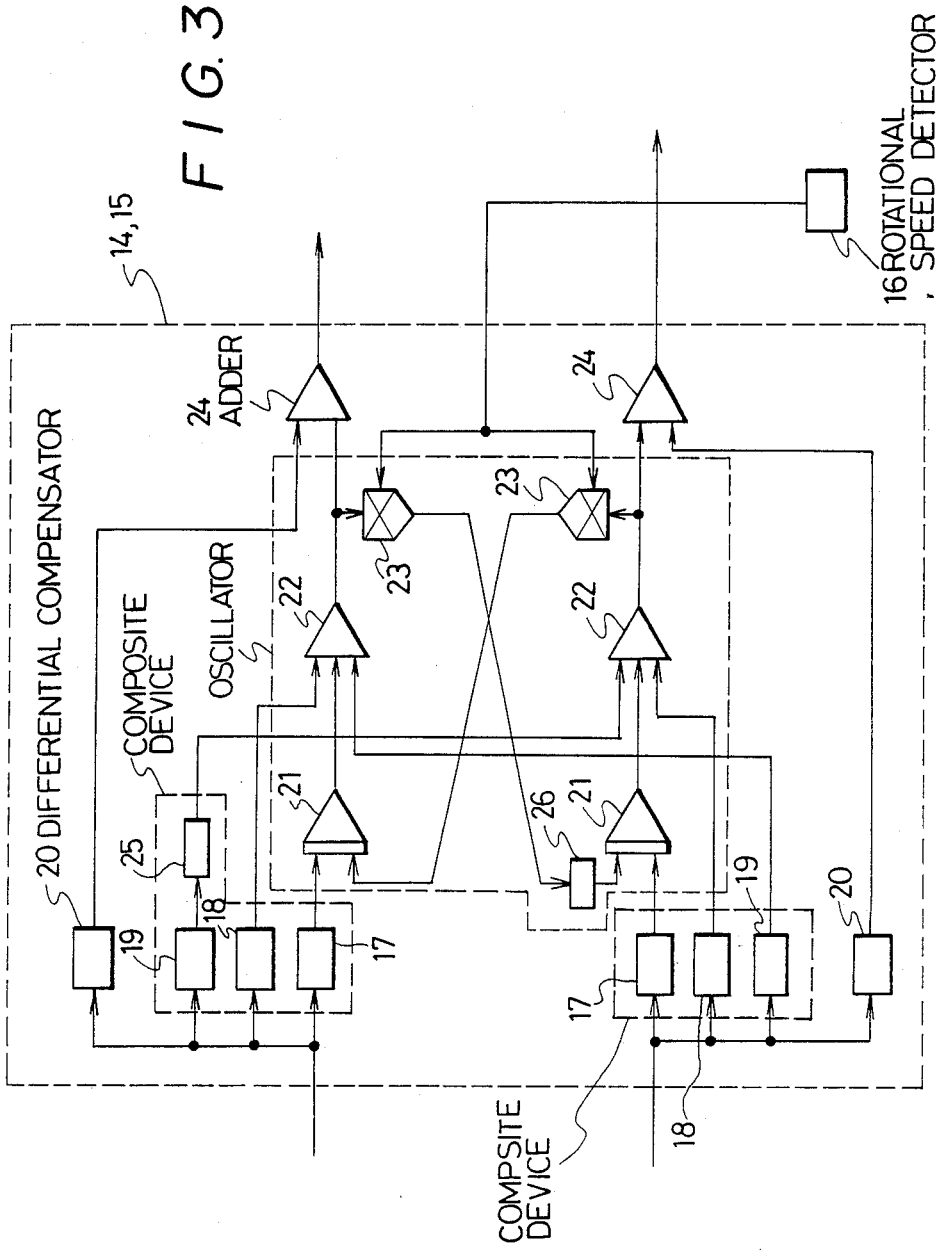
FIG. 3 is a circuit diagram of the static/dynamic unbalance compensators.

FIG. 3 shows a circuit diagram of the static unbalance compensator 14 and the dynamic unbalance compensator 15. In FIGS. 3, 17, 18, 19 are proportional compensators which produce composite signals according, 20 is a differential compensator which produces a compensational signal according to the output signals from the adders 3, 21 is an integrator, 22 is an adder, 23 is a multiplier, 24 is an adder, and 25 and 26 are inverters. In a crossing closed loop circuit formed by the integrator 21, the adder 22, the multiplier 23 and the inverter 26, an electrical signal which oscillates in synchronization with the rotational movement of the rotating body is generated in accordance with the angular velocity supplied from the rotational speed detector 16.

The amplitude and phase of the electric signal can be adjusted by the composite signals output from the proportional compensators 17, 18 and 19, the compensational signal output from the differential compensator 20 and the inverter 25. That is, when the static unbalance compensator 14 and the dynamic unbalance compensator 15 are connected as shown in FIG. 2, the difference in amplitude and phase between the synchronization signals in these unbalance compensators and the periodical whirling force due to the unbalance state can be compensated by the output of position detecting signal on the basis of the function of the correcting mechanism composed of the proportional compensators 17, 18 and 19, the differential compensator 20 and the inverter 25. The "output of position detecting signal" herein means the output signal from the adder 3 indicating the component of translational motion of the rotating body 1 in the case of the static unbalance compensator 14, and the output signal from the adder 6 indicating the component of rotational movement around the X-axis and Y-axis in the case of the dynamic unbalance compensator 15. When the exciting currents of the electromagnetic winding coils are controlled in accordance with the compensating signals output from these unbalance compensators 14 and 15, whirling of the rotating body 1 caused by the unbalance can be controlled since a force for counteracting the effect of unbalance is applied to the rotating body 1.

Figure 4:
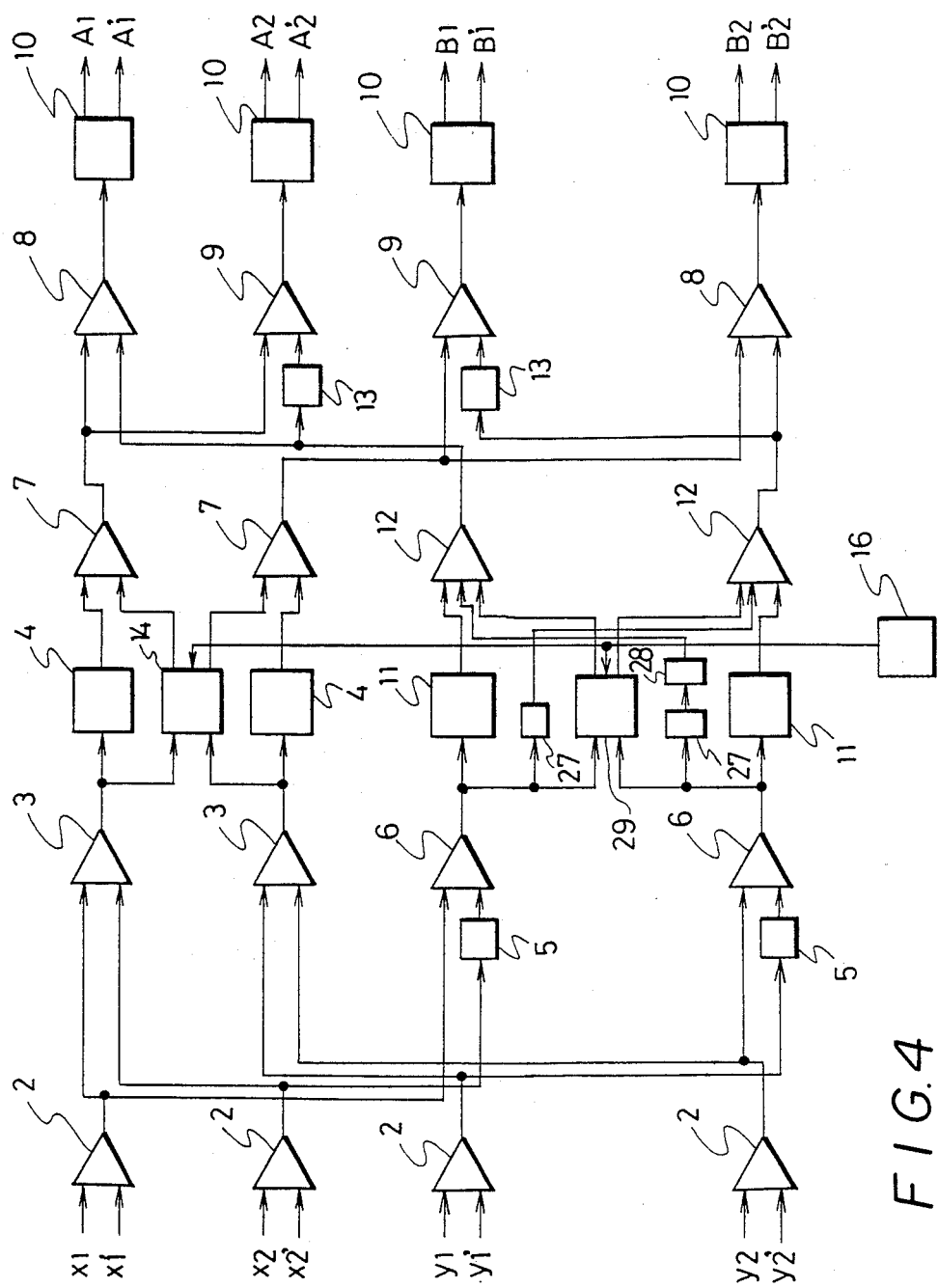
FIG. 4 is a circuit diagram of the controlled type magnetic bearing device in which a gyro-effect is considered.

FIG. 4 shows a radial direction magnetic bearing device at the time of balance compensation, in a case that the cross feed-back compensation circuit is provided for the purpose of promptly decreasing precession and nutation caused by a gyro-effect when controlling the rotational movement of the rotating body 1 around the X-axis and Y-axis. In this figure, a proportional compensator 27 and an inverter 28 are added as cross feed-back compensators in view of the gyro-effect of the rotating body. Detailed description concerning the principle, construction and effect of the cross feed-back compensation can be found in U.K. patent application No. 2,109,596A published June 2, 1983 and U.S. patent application Ser. No. 439,325, now abandoned. The circuit diagram of a dynamic unbalance compensator 29 with cross feed-back compensation is shown in FIG. 5.

Figure 5:
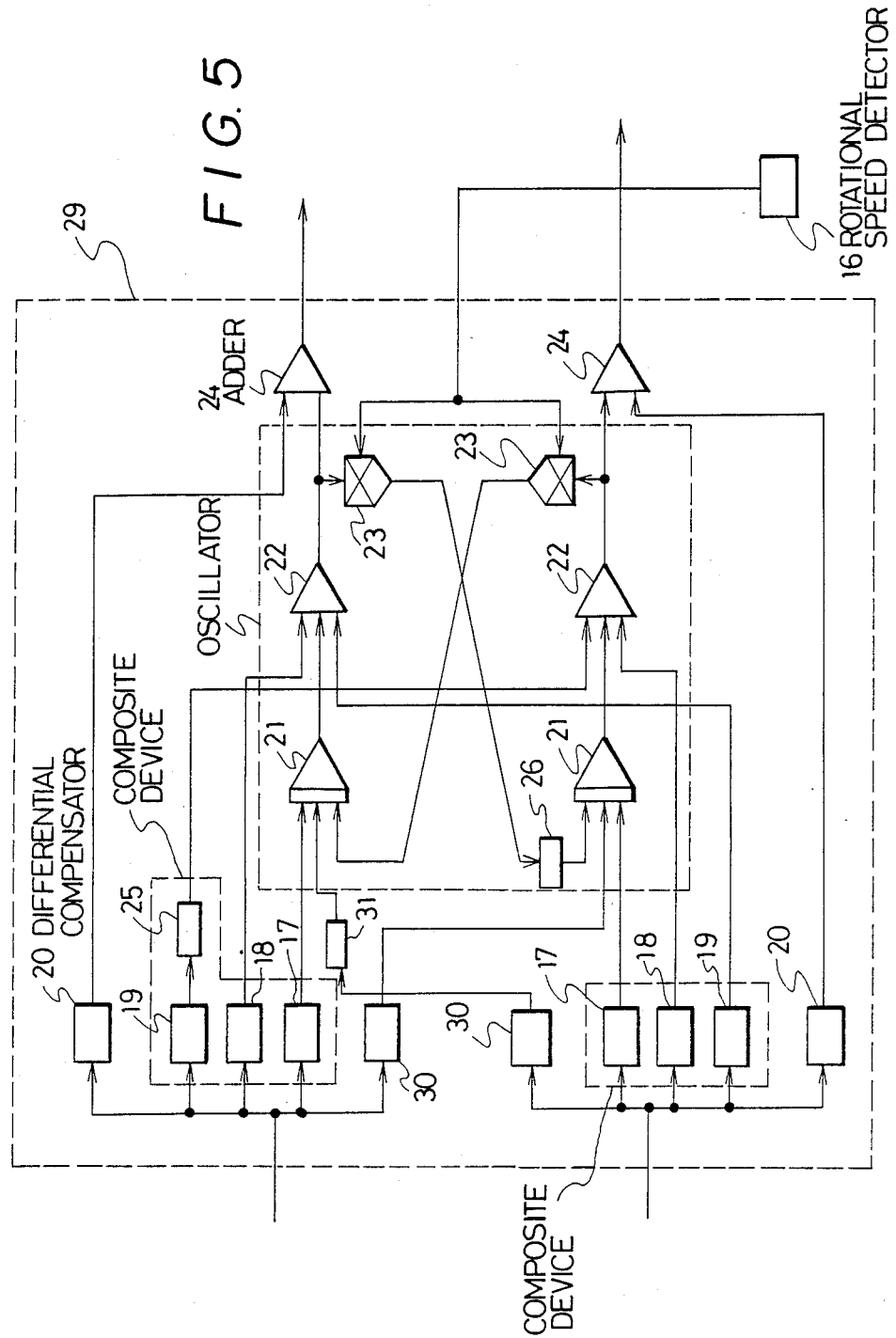
FIG. 5 is a circuit diagram of the dynamic unbalance compensator in which a gyro-effect is considered.

As shown in FIG. 5, a proportional compensator 30 and an inverter 31 are crossingly connected to the dynamic unbalance compensator 15 shown in FIG. 3 in response to the cross feed-back compensation. The proportional compensator 30 and the inverter 31, together with the proportional compensators 17, 18 and 19, the differential compensator 20 and the inverter 25, operate as a correcting mechanism in the manner described above for FIG. 3. In the dynamic unbalance compensator 29, a signal periodically oscillating in synchronization with the rotational movement of the rotating body is generated on the basis of the output from the rotational speed detector 16, by the use of two integrators 21, two adders 22, two multipliers 23 and one inverter 26. The amplitude and phase of the signal ae corrected by the above correcting mechanism so as to be coincident with those of the periodical moment force acting on the rotating body due to the dynamic unbalance.

The signal for correction is generated by the use of the proportional compensators 17, 18, 19 and 30, the differential compensator 20 and the inverters 25, 31, on the basis of the output of the position detecting signal, that is, the output from the adder 6. When the exciting current of the electromagnetic winding coil is controlled in response to the compensating signal output from the dynamic unbalance compensator 29, a moment is provided to the rotating body 1, and the moment acts on the rotating body 1 due to the dynamic unbalance, so that the whirling of the rotating body due to dynamic unbalance will be suppressed.

Figure 6:
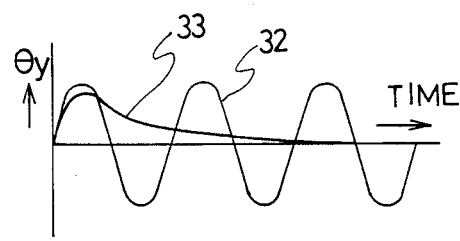
FIG. 6 is an explanatory drawing comparing waveforms of whirling.
Figure 7:
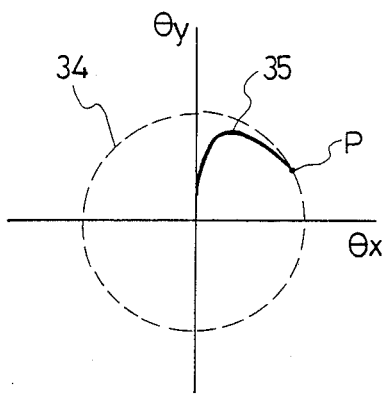
FIG. 7 is an explanatory drawing comparing Lissajous figure.

The effectiveness of the present invention will be apparent from FIGS. 6 and 7. In the figures, $\theta_x$ represents the magnitude of the change in angle around the X-axis, and $\theta_y$ represents the magnitude of the change in angle around the Y-axis. In FIG. 6, 32 designates a whirling waveform about the Y-axis when the dynamic unbalance compensator 29 is not used. In contrast, when the dynamic unbalance compensator 29 is employed, waveform 33 of the present invention rapidly decreases and converges to zero with the passage of time. FIG. 7 shows a vibrating waveform in the same time period as in FIG. 6 in the form of Lissajous figure. The whirling motion at the time of the dynamic unbalance compensator 29 is not employed is represented by a Lissajous figure 34 rotating the counterclockwise direction; however, the insertion of the dynamic unbalance compensator 29 at the P point reduces the amplitude of whirling as shown by the Lissajous figure 35.

According to the present invention, the arrangement of either or both of the static unbalance compensator and the dynamic unbalance compensator in a controlled type of radial direction magnetic bearing device enables suppression of the whirling motion provoked by unbalance in the rotating body, and it improves the rotational accuracy of the rotating body, reduces the load in the electrical power circuit and decreases vibration and noise.

What we claim is:

1. A magnetic bearing apparatus for magnetically rotatably supporting a rotatable body for rotation about a rotating axis comprising: a pair of radial magnetic bearings disposed in axially spaced relation along the rotatable body, each radial magnetic bearing having at least two electromagnets operative when excited to produce a magnetic field for magnetically rotatably supporting the rotatable body in radial directions; sensing means associated with each radial magnetic bearing for sensing the radial deviation of the rotatable body along at least two radial axes and producing corresponding output signals; and circuit means responsive to the output signals for deriving therefrom compensating signals effective to suppress any swing rotation of the rotatable body about the rotating axis during rotation of the rotatable body and for processing the compensating signals to produce control signals for controlling the excitation of the electromagnets so that they produce magnetic fields which effectively eliminate swing rotation of the rotating rotatable body, said circuit means including a static and a dynamic unbalance compensator circuit including in each circuit a crossing closed loop circuit comprised of a pair of integrators, a pair of adders and a pair of multipliers all interconnected in a crossing closed loop configuration.

2. A magnetic bearing apparatus according to claim 1; wherein the dynamic unbalance compensator circuit includes a cross feed-back compensation circuit.

3. A magnetic bearing apparatus for magnetically rotatably supporting a rotatable body for rotation about a rotating axis comprising:

a pair of radial magnetic bearings disposed in axially spaced relation along the rotatable body, each radial magnetic bearing having at least two electromagnets operative when excited to produce a magnetic field for magnetically rotatably supporting the rotatable body in radial directions;

sensing means associated with each radial magnetic bearing for sensing the radial deviation of the rotatable body along at least two radial axes and producing corresponding output signals;

a rotational speed detector for detecting the rotational speed of the rotatable body and producing a corresponding rotational speed signal; and circuit means including either or both of a static unbalance compensator for producing output signals for suppressing whirling motion of the rotatable body caused by static unbalance in dependence on input signals which contain a component of translational motion of the rotatable body and a dynamic unbalance compensator for producing output signals for suppressing whirling motion of the rotatable body caused by dynamic unbalance in dependence on input signals which contain a component of rotational movement of the rotatable body, each said compensator comprising differential compensators for producing output compensational signals in response to the output signals from said sensing means, means responsive to the output signals from said sensing means for producing different composite signals according to the output signals from said sensing means, oscillating means responsive to the composite signals and to the rotational speed signal for producing oscillating signals which are synchronized with the rotational movement of the rotatable body and which have an amplitude and phase adjusted according to the compensational signals and composite signals, and adders connected to receive the oscillating signals and the compensational signals and operative to combine the same to produce output signals effective to suppress whirling motion of the rotatable body.

* * * * *